Nov. 11, 1969  C. C. HANSEN  3,477,610
TANK LINER ASSEMBLY
Filed March 8, 1968  3 Sheets-Sheet 1
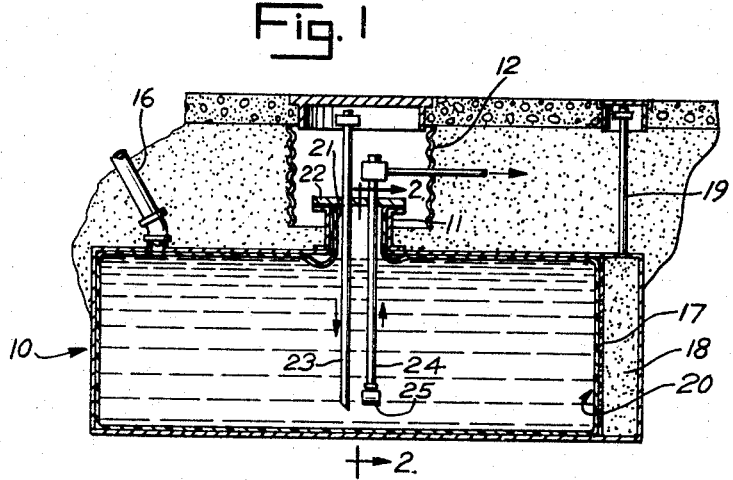
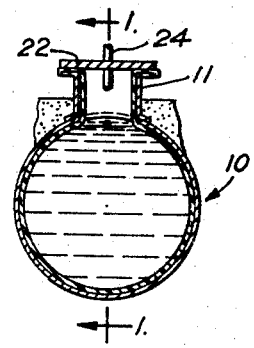
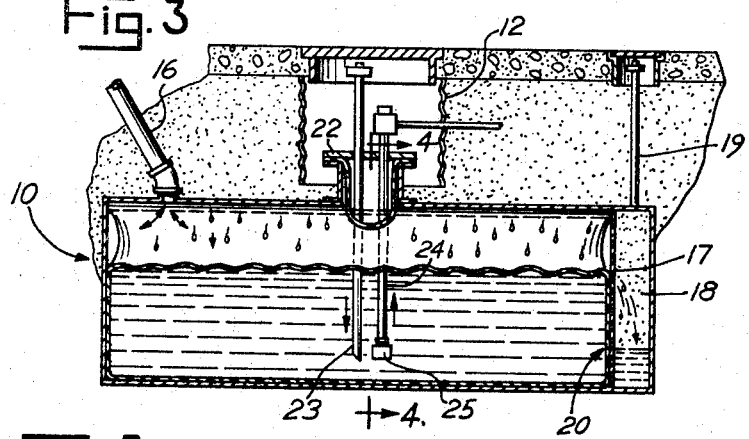
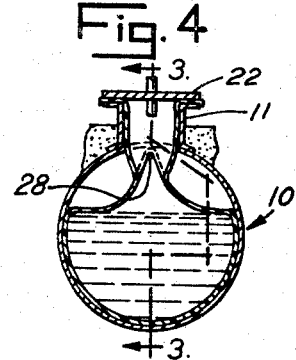
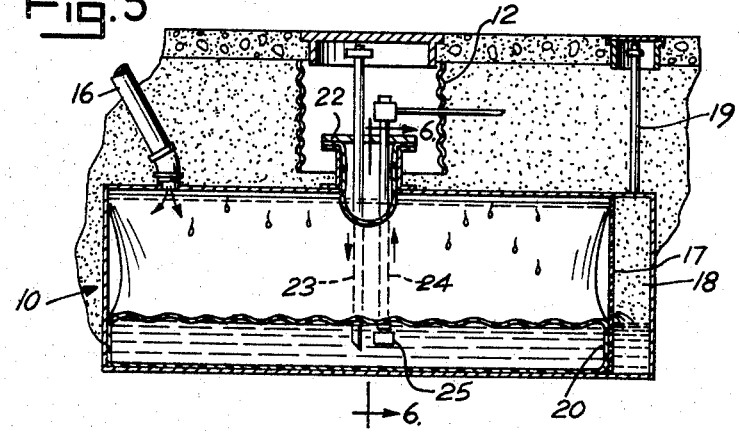
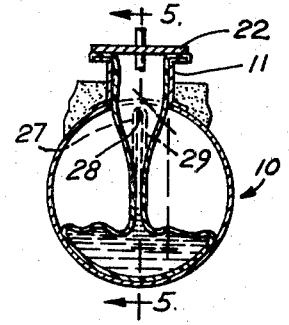
INVENTOR
CLAYTON C. HANSEN
BY
Dominik, Stein & Knechtel
ATTORNEYS

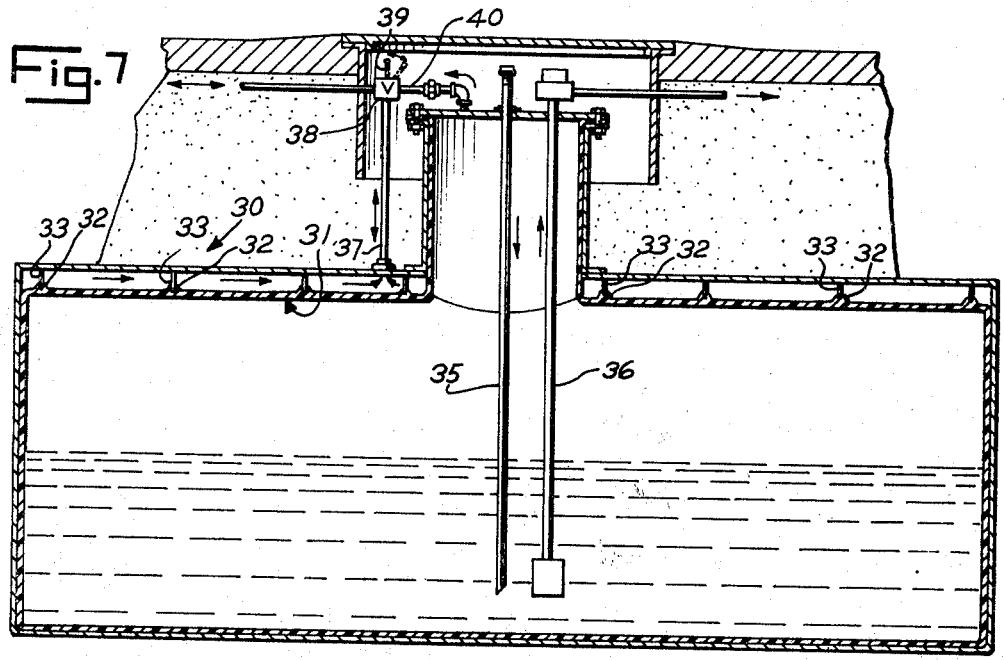
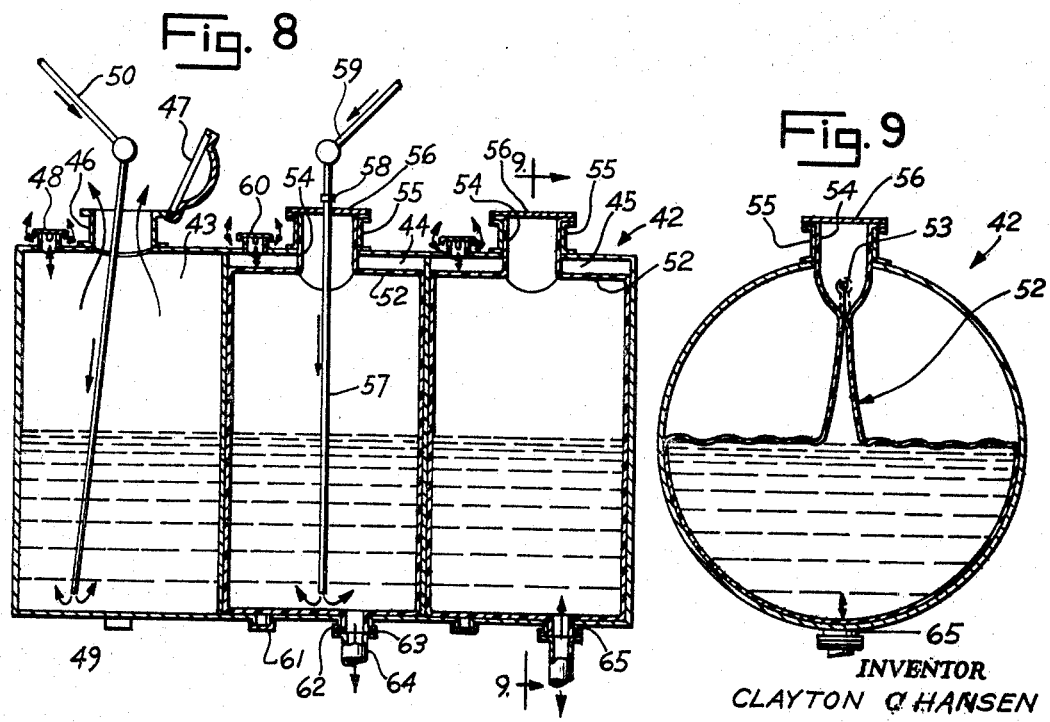

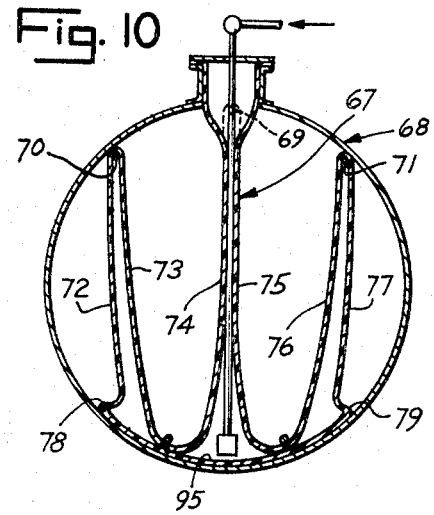
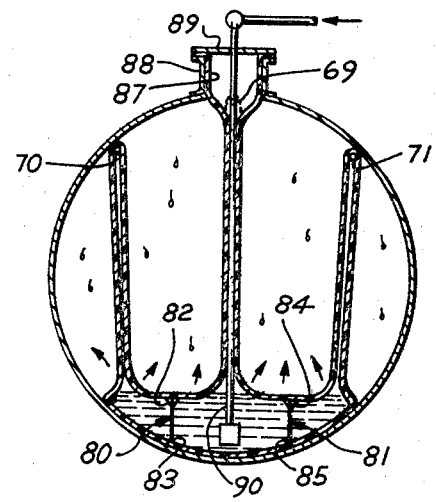
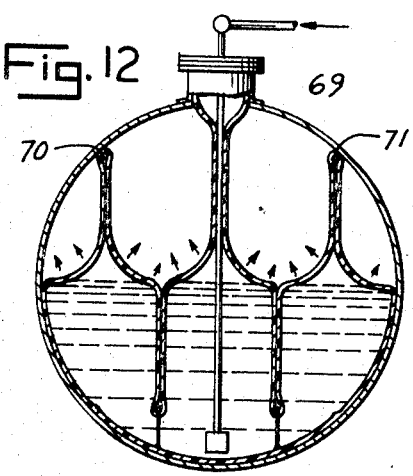
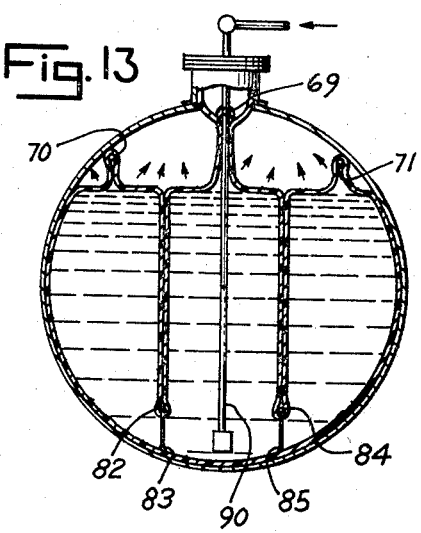
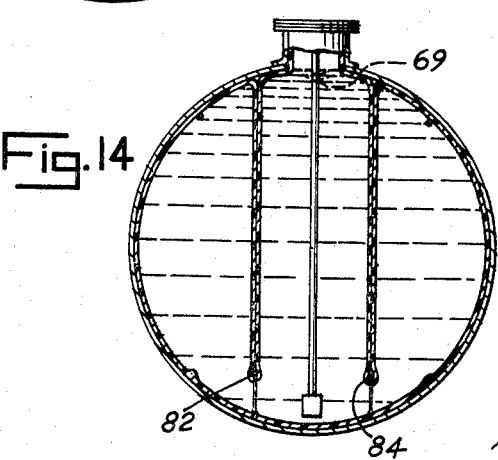

United States Patent Office 3,477,610
Patented Nov. 11, 1969

3,477,610
TANK LINER ASSEMBLY
Clayton C. Hansen, 202 Willow Lane,
Elk Grove Village, Ill. 60007
Filed Mar. 8, 1968, Ser. No. 711,621
Int. Cl. B65d 25/16; B67d 1/00
U.S. Cl. 220—63                                    7 Claims

ABSTRACT OF THE DISCLOSURE

A tank liner assembly adapted to be erected and suspended from the interior of a previously erected horizontally disposed cylindrical bulk storage tank, the liner normally being collapsed and hangingly supported along its longitudinal length and being expanded against the side walls of the tank as a product is loaded into the liner.

---

This invention relates to flexible tank liners and, more particularly, to a tank liner assembly suitable for installation in new, as well as existing, storage tanks.

Numerous flexible tank liners previously have been proposed, for use in storage tanks to protect the latter from attack by the fluid stored therein or to prevent loss of the fluid in storage tanks which have deteriorated and are subject to leakage. Liners also have been used in storage tanks in a fashion such as to permit different fluids to be stored and/or transported therein, without one fluid contaminating the other. Each of these tank liners, however, has been unsatisfactory, for one reason or another.

For example, in U.S. Patent 2,758,747, there is disclosed a multiple compartment tank wherein a flexible liner is used to permit different fluids to be transported in the tank, without danger of one fluid contaminating the other. The liner comprises an imperforated flexible, bag-like member formed of rubber, plastic, treated fabric, or other suitable material of a size such that it can be placed and secured within the tank in a fashion such that the liner can be filled to the capacity of the tank, or the tank itself can be filled. When the tank and the liner are empty, the liner merely collapses on the bottom of the tank.

It is generally impractical to use such a liner in large capacity storage tanks since exceptionally high pressures are required to expand the collapsed liner because of its heavy weight. In particular, it is virtually impossible to fill the tank using a gravity feed and, since a gravity feed is used in a large number of applications, this liner and the manner in which it is installed within the tank is entirely unsatisfactory and unacceptable.

Another flexible liner is disclosed in U.S. Patent 3,167,209. In this case, the liner is installed and affixed within the tank in a fashion such that the liner normally is fully expanded and conforms to the interior of the tank. It does not collapse when the product is withdrawn. A liner of this type therefore functions only to recondition a tank which has deteriorated, or to protect the tank against attack by the product stored therein. As more fully explained below, it will not function or assist in reducing vapor losses and, for this reason, they generally are not accepted in the industry.

Accordingly, it is an object of the present invention to provide new and improved flexible tank liners.

More particularly, an object is to provide new and improved flexible tank liners which are adapted for installation in large capacity storage tanks, in a fashion such that they can be easily filled using a gravity feed.

Another object is to provide new and improved flexible tank liners of the above type which can be easily installed in storage tanks both to protect the tanks from attack by the fluid stored therein and to re-condition storage tanks which have deteriorated.

Still another object is to provide new and improved flexible tank liners which are adapted to be installed within storage tanks in a fashion such that vapor losses are substantially reduced.

Still another object is to provide improved flexible tank liners which are adapted to be installed in storage tanks in a fashion such as to permit top loading or bottom loading of said storage tanks.

A still further object is to provide improved flexible tank liners which are installed in storage tanks in a fashion such that the hazard of an explosion due to a static build-up in the product during loading is substantially, if not completely, eliminated.

A still further object is to provide improved flexible tank liners and a method of installing them in a storage tank so as to prevent condensation from contaminating the product within the tank. In this respect, it is further contemplated that the liner be installed in the tank in a fashion such that condensation can be easily collected and removed therefrom and loss of product from the liner can be easily and quickly detected.

Another object is to provide improved flexible tank liners and method of installing them within storage tanks whereby faster loading rates can be obtained and/or tolerated.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

For a fuller understanding of the nature and objects of the invention, reference should be had to the following detailed description taken in connection with the accompanying drawings in which:

FIG. 1 is a sectional view taken longitudinally through a generally cylindrical-shaped storage tank, to illustrate the method in which a liner is affixed within the tank and to illustrate the configuration of the liner when it is full;

FIG. 2 is a sectional view taken along lines 2—2 of FIG. 1.

FIG. 3 is a sectional view like FIG. 1, illustrating the configuration of the liner when it is three-quarters full;

FIG. 4 is a sectional view taken along lines 4—4 of FIG. 3;

FIG. 5 is another sectional view like FIG. 1, illustrating the configuration of the liner when it is one-quarter full;

FIG. 6 is a sectional view taken along lines 6—6 of FIG. 5;

FIG. 7 is still another sectional view like FIG. 1, illustrating an alternative construction of the storage tank and the liner;

FIG. 8 is a sectional view taken substantially longitudinally through a multi-compartment tank, illustrating one compartment thereof as presently used and filled, and two of the compartments thereof having liners installed therein, in accordance with the present invention, for top filling and for bottom filling, respectively;

FIG. 9 is a sectional view taken along lines 9—9 of FIG. 8; and

FIGS. 10–14 are sectional views taken transversely through a generally cylindrical-shaped storage tank, to illustrate still another method of installing a liner therein and further illustrating the liner configuration when it is empty, one-eighth full, one-half full, three-quarters full and substantially full, respectively.

Similar reference characters refer to similar parts throughout the several views of the drawings.

Referring now to the drawings, in FIGS. 1–6 there is illustrated a generally cylindrical-shaped storage tank 10 having a man-way 11. The tank 10 is shown as being buried underground; however, it could as well be above ground. A manhole 12 is provided for gaining access to the tank 10, and the ground surface above the tank can be paved with asphalt or concrete 13. A removable steel cover plate 14 is provided to close the manhole.

The tank 10 has a vent line 16 for venting its interior to the atmosphere, which vent line preferably is coupled to the tank at some point of its periphery at the top thereof. A perforated baffle plate 17 having the same diameter as the tank 10 preferably is fixedly secured within the tank at a spaced distance from one end thereof so as to form a small chamber 18. This chamber 18 is provided to collect water and condensation which forms or accumulates within the tank 10, and a draw-off line 19 advantageously is provided for periodically draining it.

A tank liner 20 preferably of an elastomeric or plastic material immune to attack by the fluid to be stored therein is affixed within the tank 10, in a manner described more fully below. The liner 20 preferably has the same or slightly greater capacity than the tank 10 so that when it is filled it expands and engages the walls of the tank, but is not stretched or stressed. The liner 20 also has a generally cylindrical-shaped man-way extension 21 which is adapted to extend into and through the man-way 11. The upper edge of the extension 21 is fixedly secured about the upper edge of the man-way 11 in a fashion such as to effectively seal the interior of the tank 10 so that extraneous materials such as dirt and water are prevented from entering the tank. This is accomplished by, for example, folding the upper peripheral edge of the extension 21 so that it overlays the rim of the man-way 11, and then fixedly securing the same over the rim by affixing a steel cover plate 22 over it to both anchor and seal it in place. Other suitable means also can be used. A fill tube 23, which extends through the cover plate 22 and into the liner, is provided for filling the tank 10 or, more specifically, the liner 20. The end of the fill tube 23 preferably is positioned adjacent and slightly spaced from the bottom of the tank, as illustrated. A product discharge line 24 also is extended through the cover plate 22, for withdrawing the product from the tank. In this case also, the end of the discharge line 24 is positioned adjacent and slightly spaced from the bottom of the tank 10, and may have a submergeable pump 25 affixed to it, for pumping the product through the discharge line 24.

The liner 20 expands and collapses with the product as the latter is pumped into or is withdrawn from the tank so that large air spaces in which gaseous fumes can accumulate are substantially eliminated. This feature is particularly important in cases where volatile fluids such as gasoline are stored in the tank. Normally, during loading of a volatile product, using present methods, there is a considerable vapor loss since the tank and/or the liner therein is vented to the atmosphere. and the vapor is thereby expelled into the atmosphere. In the instant case, vapor loss is substantially, if not completely, eliminated, since the liner is not vented to the atmosphere and the lack of large air spaces within the liner prevents any substantial amount of vapor to accumulate. It is instead generally forced into saturation.

Present methods of installing liners in tanks also create dangerous or hazardous conditions from either toxic or explosive vapors being expelled into the atmosphere, in the manner described above. These conditions, of course, also are substantially, if not completely, eliminated since, as indicated above, the vapors are contained within the liner 20.

Still another dangerous condition which is eliminated is the danger of an explosion occurring due to a static charge buildup within the tank as a result of the product being pumped at high rates through filters, restrictions, relatively small line sizes, etc. A vapor rich atmosphere is created within the liner 20 since there are no large air spaces, and there is an almost complete lack of oxygen within the liner, hence combustion cannot occur.

Even though the liner 20 expands and collapses with the product, the heretofore objectionable fact that the weight of the collapsed liner requires high pressures to fill the tank, which fact, of course, prevented the tanks from being gravity loaded, is overcome. More particularly, as can be best seen in FIGS. 4 and 6, the liner 20 is fixedly secured and suspended centrally along its length, by means of anchoring means 28. The anchoring means 28 can be a telescoping rod or pole which can be collapsed to permit it to be installed within the tank 10. Alternatively, it can be a solid rod or pole of sufficient strength to support the liner 20, when affixed to the end wall of the tank and to baffle plate 17 or opposite end wall. Provisions also can be made to support the rod or pole at spaced distances along its length, if necessary or desirable. A rod or pole of this type is installed within the tank by drilling or otherwise forming an aperture in the end wall of the tank of sufficient size to permit the rod or pole to be inserted into the tank, and thereafter closing and sealing the aperture in a suitable fashion. The telescoping or solid rod or pole can be secured to the liner 20 to suport it by, for example, slidably extending it through a pocket (not shown) formed along the length of the liner, or any other suitable fashion. The anchoring means 28 also can be in the form of spaced-apart reinforced eyelets which are integrally formed with or otherwise fixedly secured to the liner 20, and are adapted to receive an associated hook or other support member affixed to the tank, as illustrated in FIG. 7, described fully below.

When supported in the above-described manner, the liner 20 collapses and its sides fold inwardly toward one another, generally as illustrated in FIG. 6. The full weight of the liner 20 therefore does not bear on the bottom of the tank or the product within the liner, since the liner is supported and suspended in a generally vertically disposed position. When the tank 10 is being loaded, it is not necessary to force the product into the liner under high pressure in order for the product to effectively lift the weight of the collapsed liner. Instead, the product upon being loaded into the tank or liner, merely flows between the vertically disposed folds of the liner 20. As the liner 20 fills, its sides are urged outwardly, against the side walls of the tank 10. Accordingly, very little pressure is required to fill the tank, and a gravity load can be used. This action is generally illustrated in FIGS. 2, 4 and 6. In FIG. 6, the liner 20 is approximately one-quarter full and it can be seen that the product flows upward between the vertically disposed folds 27 and 29 thereof. As the product continues to flow into the liner, these folds are progressively urged outwardly, against the side walls of the tank, as generally illustrated in FIG. 4 where the tank is now shown to be approximately one-half full. In FIG. 2, the liner 20 is shown to be substantially full, and it can be seen that the walls of the liner are expanded so as to substantially fill the tank. In FIGS. 1, 3 and 5, the tank and the liner are illustrated as the liner generally appears during the filling or loading stages of FIGS. 2, 4 and 6, respectively.

The tank 10, as indicated above, includes a perforated baffle plate 17 which forms a chamber 18 at one end of the tank in which water and condensation can collect. As generally illustrated in FIGS. 3 and 5, the condensation which forms within the tank drips onto the liner 20 and flows into the chamber 18. The tank 10 preferably is disposed so that its end having the chamber 18 in it is slightly lower, preferably approximately one inch lower for each ten feet length of the tank, than its opposite end, to enhance the flow toward and into the chamber 18. The chamber 18 can be drained periodically, by pumping the water out of it through the draw-off line 19. Accordingly, the chamber 18 provides a convenient manner for removing the condensation which forms in the tank 10.

The chamber 18 also provides a convenient means for detecting leaks which, although unlikely, may develop in the liner 20. If a leak should occur, the product will drain into the chamber 18. It is therefore only necessary to run a continuous or periodic test on the water drained from the chamber to determine whether it contains any of the product. If it does, it is a ready indication that a leak exists and repairs can be made, if necessary.

The man-way 11 of the tank 10 should be of sufficient size to permit a man to enter the tank through it. Accordingly, in installing the liner 20, the liner is folded or rolled to permit it to be extended through the manhole 12, the man-way 11 and into the tank 10, and to be easily un-folded or un-rolled within the tank. Thereafter, it is suspended by means of the anchoring means 28, in the above-described fashion, and its man-way extension 21 affixed within the man-way 11 and the tank 10 sealed using a cover plate 22. Entrance to the liner 20 likewise is provided, once it is installed through the man-way 11, hence leaks and other repairs to the liner can be easily made.

The vent line 16 permits air within the tank 10 to be vented to the atmosphere and, since all of the vapor fumes are contained within the liner 20, the vented air is non-toxic and non-combustible. Accordingly, as indicated above, the dangerous conditions created when toxic and combustible vapors are vented to the atmosphere are eliminated. The vent line 16 also permits air within the tank 10 to be expelled as the liner 20 expands and fills the tank, so that there is no build-up of pressure within the tank which would reduce the fill rate and limit or restrict the capacity of the liner.

It also is found that by installing the liner 20 in the above described fashion and by extending the fill tube to the bottom of the tank, faster filling or loading rates (gallons per minute) can be obtained and/or tolerated than heretofore generally possible with the presently available liners. Also, as indicated above, during filling, vapor loss is substantially reduced so that the tank can be loaded faster, with a reduction in loss of product due to vapor losses. The product, furthermore, is protected from contaminants such as water, condensation forming in the tank 10, dirt, dust and other extraneous material which are drawn into the tank through the vent line 16 when the product is discharged from the liner so that the product which is discharged is as fresh and clean as when delivered or loaded into the tank.

In FIG. 7 there is illustrated another generally cylindrical-shaped storage tank 30 having a liner 31 installed therein, both of which are generally like the tank 10 and liner 20, respectively. In this case, however, the liner 31 is illustrated as having anchoring means in the form of a number of eyelets 32 integrally formed or otherwise affixed to it, at its top, along its length. These eyelets 32 are adapted to receive an associated one of a number of support members 33 fixedly secured, in correspondingly spaced positions, to the top of the tank. These support members 33 can be hook-shaped members, U-shaped members or other similarly constructed members which can be freely extended through the eyelets 32 and fixedly secured to the tank 30 to support the liner 31, generally in the manner described above.

The baffle plate 17 of the tank 10, in this case, is eliminated; however, it could be provided, if desired. The tank 30 includes a fill tube 35 and a product discharge tube 36, for loading and expelling the product from the tank, in the manner described above. A vent line 37 again is provided to vent the interior of the tank 30, between its side walls and the liner 31, to the atmosphere. The vent line 37, in this case, however, is coupled to a pressure relief valve 38 which can be manually operated by means of a valve lever 39, as illustrated, or it can be adapted for automatic operation when a predetermined pressure exists within the liner 31. The interior of the liner 31 is vented through the relief valve 38, via a pressure line 40.

The disclosed arrangement is particularly applicable for use with storage tanks in which highly volatile products are stored. Products of this type tend to vaporize to a far greater degree and, in many cases, create a pressure above atmospheric within the tanks and/or liners in which they are contained. Accordingly, it is necessary to bleed-off these vapors whenever it becomes necessary to add liquid to the tank by a gravity method. With the above-described arrangement, the pressure relief valve 38 is normally open to vent the interior of the tank to the atmosphere, through the vent line 37. When it becomes desirable to add liquid to the tank, relief valve 38 is operated, by means of the valve lever 39, to vent the interior of the liner 31 to the atmosphere, through the pressure line 40 and the relief valve 38. When the internal pressure drops to atmospheric, the relief valve 38 is again returned to its original position and the filling operation can be completed. As indicated above, the relief valve 38 can be adapted to automatically perform these operations, if desired.

During loading and removal of the product from the tank, the liner 31 expands and collapses, in the manner described above in the case of the tank 10 and the liner 20.

In FIGS. 8 and 9, there is illustrated a generally cylindrical-shaped multi-compartment storage tank 42 including compartments 43, 44 and 45. Only three compartments are illustrated; however, a lesser or greater number can be provided therein, if desired. Also, the tank 42 can be of the type immovably mounted on support means above ground or buried in the ground, or it can be mounted on a transport truck of the well-known type used for transporting products from one location to another.

In FIG. 8, the compartment 43 is illustrative of the manner in which products are presently generally loaded into, transported, and unloaded from such a tank. The compartment does not have a liner installed in it, but it does have a dome 46 at its top which is closable and sealable with a dome cover 47, a venting device 48 for venting the interior of the compartment to the atmosphere, for excessive pressure and vacuum relief, and a product discharge port 49 at its bottom through which the product can be unloaded. In this respect, the compartment 43 is of the standard type generally well-known in the art.

In loading the compartment 43, normally a fill loading arm 50 is extended through the dome 46 and into the interior of the compartment, with its discharge end adjacent the bottom thereof. As the product is being loaded into the compartment, vapors generally accumulate in the space above the level of product and the top of the compartment. It is common knowledge that a static charge generally builds up in the product while flowing through filter separators, valves, restrictions and loading assemblies at high line velocities, and extreme cautions must be taken to prevent the same from discharging in a combustible vapor atmosphere, otherwise an explosion can occur. In addition to the fact that this hazard exists, considerable product is lost from venting the agitated vapor to the atmosphere.

In accordance with the present invention, vapor loss and the hazard of an explosion can be substantially eliminated by installing liners 52 in compartments 44 and 45, as illustrated in FIG. 8. These liners 52 are supported within the compartments 44 and 45, in the manner described above, by means of a rod or pole 53 (FIG. 9), or by means of eyelets and support means, such as the eyelets 32 and the support means 33 shown in FIG. 7, or any other means. Also, these liners 52 each have dome extensions 54 which extend through the domes 55 of the compartments and have the upper edges thereof anchored by means of cover plates 56 removably fixedly secured atop the domes, in a fashion such as to seal the closure. A fill drop tube 57 is extended into the compartment 44 to a position adjacent the bottom of the liners 52 and its upper end is extended a short length through the cover plates 56 and fixedly secured therein. The upper end of the fill drop tube 57 has a coupler 58 affixed to it, which is adapted to receive the end of a fill loading arm 59, for loading the compartment 44. With this arrangement, a much shorter fill loading arm which can be more easily handled by a man can be used in loading the compartment, hence loading is made far easier and safer for the person handling the same. Also, as in the above-described cases, the interior of the liner 52 is effectively sealed from the atmosphere and any vapor which accumulates within the liner creates a vapor-rich atmosphere. A static charge build-up in the product may occur; however, an explosion is prevented since there is almost a complete lack of oxygen in the liner combustion cannot occur.

A venting device 60 is provided in the top wall of the compartment 44, for venting its interior to the atmosphere. A drain port 61 advantageously is provided in the bottom wall of the compartment. The drainage from the drain port 61 can be inspected for traces of the product, to determine whether the liner 52 has a leak in it. A product discharge port 62 including a flow valve (not shown) is provided in the bottom wall of the compartment 44, and the liner 52 is extended through and anchored therein, by means of a ring-shaped clamping plate 63, in generally the same fashion as the dome extension 54 is anchored in the dome 55. The clamping plate 63 further is adapted to have a pipe line 64 coupled to it, for removing the product from the compartment.

The liner 52 is installed in the compartment 45 in generally the same fashion as the liner is installed in the compartment 44. The compartment 45, however, is adapted for both loading and unloading through the port 65 in its bottom wall. The port 65 can be like the product discharge port 62 in the compartment 44. The fill drop tube 57 is, of course, eliminated in this case.

In the case of multi-compartment storage tanks, particularly large permanently installed ones, the dividing walls of the compartments advantageously are rippled or otherwise formed to provide a number of drain spaces between the liner and the walls of the compartment, to permit water, condensation and the like to flow off of the liner and to the bottom of the tank. Alternatively, baffle plates or he like which are similiarly formed can be affixed to the dividing walls to provide these drain spaces.

FIGS. 10–14 each are sectional views taken transversely through a generally cylindrical-shaped storage tank 68, generally like tanks 10 and 30, and illustrating an alternative manner of installing a liner 67. The liner 67 is supported suspended centrally along the length of the tank 68, by means of centrally disposed anchor means 69 and anchor means 70 and 71, which preferably are spaced equal distances apart, on opposite sides of and parallel to the anchor means 69. The anchor means 69–71 can be telescoping or solid rods or poles like the rod or pole 28, or eyelets and support members like the eyelets 32 and support members 33. Six vertically disposed folds 72–77 are formed, when the liner is suspended by the anchor means 69–71 in this fashion.

The liner 67 also is anchored at two points on the bottom of the tank 68, by means of anchor means 78 and 79 which are positioned substantially vertically beneath the anchor means 70 and 71. The anchor means 78 and 79 also can comprise rods or poles or eyelets and support members, if desired. These anchor means 78 and 79 are affixed to the folds 72 and 77 of the liner 67 in a fashion such that there is sufficient liner material available between the anchor means 70 and 71 and the anchor means 78 and 79, respectively, to expand outwardly to engage the walls of the tank 68 without being stretched.

Still additional anchor means 80 and 81 are fixedly secured within the liner 67 in a fashion such that the length of the liner from the anchor means 69 to the anchor means 80 is substantially the same as its length from the anchor means 80 to the anchor means 70. The same is true with respect to the length of the liner between anchor 81 and respective ones of the anchor means 69 and 71. The anchor means 80 and 81 are lengths of rods, cables or the like capable of anchoring the points 82 and 84, respectively, of the liner, so that the product can flow under the folds of the liner, as described more fully below. The length of the anchor means 80 and 81 and the length of the liner between points 69, 82 and 70, and between points 69, 84 and 71, respectively, is such as to permit the tank to be filled to its capacity. The points 83 and 85 are, in turn, fixedly anchored in a suitable fashion to the bottom of the tank 86, or to a semi-rigid bottom 95 of the liner. The latter can be a substantially heavy-weight or gauge plastic or other elastomeric material bonded to the liner, between the anchor means 78 and 79, to provide the liner with sufficient rigidity so that it can be stretched out and caused to lie flat on the bottom of the tank. The semi-rigid bottom 95 also can be in the form of weight sheets or other lengths of material which will function to cause the liner to conform to the contour of the bottom of the tank, however, regardless of the material used, preferably it is or can be rolled, folded or otherwise arranged so that the liner can be easily installed in the tank.

The liner 67 also has a man-way extension 87 which is affixed within the man-way 88 of the tank 68, by means of a cover plate 89, in the manner described above. A fill tube (not shown) and a product discharge tube 90 are affixed within the tank 68, for loading and unloading it. A venting device (not shown) also is provided to vent the interior of the tank to the atmosphere.

When the tank 68 is empty, the liner 67 is collapsed and hangs suspended therein, generally as illustrated in FIG. 10. Its weight is generally supported by the anchor means 69–71, so that it is easily filled, by gravity feed or otherwise, and high pressures are not required.

As the product is loaded into the tank, the product fills the bottom of the liner which rests on the bottom of the tank, and evenually flows beneath the folds of the liner, along its length, at the points 82 and 84, as illustrated in FIG. 11. As loading continues, the product flows between the folds 72, 73; the folds 74, 75 and the folds 76, 77, generally as illustrated in FIGS. 12–14. It can be seen that this action forcibly urges the folds 72 and 77 outward in engagement with the walls of the tank 68. Also, it forcibly urges the folds 73 and 74 and folds 75 and 76 into abutting relationship to form, in effect, a pair of vertically disposed dividers within the liner which extend lengthwise thereof.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. A horizontally disposed cylindrical bulk storage tank and a tank liner assembly erected and suspended from the interior thereof, said liner being of a flexible elastomeric material closed except for an inlet and an outlet opening and having dimensions greater than those of the tank to be lined, said liner normally being collapsed and hangingly supported along its longitudinal length from the top of said tank, and being expanded against the side walls of said tank as a product is loaded into said liner, said liner being expanded and collapsed with the product as the latter is loaded into and withdrawn from said liner.

2. The horizontally disposed cylindrical bulk storage tank and tank liner assembly of claim 1, wherein said liner is hangingly supported along its longitudinal length centrally of said tank, and is normally collapsed with its side walls hanging in generally vertically disposed positions.

3. A horizontally disposed cylindrical bulk storage tank and a tank liner assembly erected and suspended from the interior thereof, said liner being of a flexible elastomeric material closed except for an inlet and an outlet opening and having dimensions greater than those of the tank to be lined, said liner being hangingly supported along its longitudinal length from the top of said tank in a plurality of spaced positions and being normally collapsed so that it hangs and forms a plurality of generally vertically disposed folds which are spaced apart and extend longitudinally along the length of said tank.

4. The horizontally disposed cylindrical bulk storage tank and tank liner assembly of claim 3, wherein predetermined ones of said folds are anchored at and in spaced relation to the bottom of said tank.

5. The horizontally disposed cylindrical bulk storage tank and tank liner assembly of claim 4, wherein said liner includes a semi-rigid portion on its bottom which extends and forms an arcuate liner portion that generally lies flat on the bottom of said tank.

6. The horizontally disposed cylindrical bulk storage tank and tank liner assembly of claim 3, wherein said liner is hangingly supported along its longitudinal length centrally of said tank and in two positions which are disposed parallel to and on opposite sides of said central support, and is normally collapsed so that it hangs and forms three generally vertically disposed folds which are spaced apart and extend longitudinally along the length of said tank, two of said folds being anchored at and in spaced relation to the bottom of said tank.

7. A horizontally disposed cylindrical bulk storage tank and a tank liner assembly erected and suspended from the interior thereof, said liner being of a flexible elastomeric material closed except for an inlet and an outlet opening and having dimensions greater than those of the tank to be lined, said liner normally being collapsed and hangingly supported along its longitudinal length from the top of said tank, and being expanded against the side walls of said tank as a product is loaded into said liner, and perforated plate means disposed in spaced relation to one end of said tank, said perforated plate means forming a compartment in which extraneous materials can collect, means for removing said extraneous material from said compartment, whereby water, condensation and the like forming between said liner and said tank can be collected and removed from said tank, said compartment also providing means whereby leaks in said liner can be detected by testing the extraneous material as it is removed to determine whether it contains any of the stored product.

References Cited

UNITED STATES PATENTS 3,167,209  1/1965  Jones _____ 220—63

GEORGE T. HALL, Primary Examiner

U.S. Cl. X.R.

220—86; 222—386.5